(12) United States Patent
Hashimoto et al.

(10) Patent No.: US 10,505,485 B2
(45) Date of Patent: Dec. 10, 2019

(54) MOTOR CONTROLLER

(71) Applicant: FANUC CORPORATION, Yamanashi (JP)

(72) Inventors: Shoutarou Hashimoto, Yamanashi (JP); Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/019,930

(22) Filed: Jun. 27, 2018

(65) Prior Publication Data

US 2019/0036471 A1    Jan. 31, 2019

(30) Foreign Application Priority Data

Jul. 28, 2017 (JP) ................................. 2017-146987

(51) Int. Cl.
| | |
|---|---|
| *H02P 23/00* | (2016.01) |
| *H02P 23/08* | (2006.01) |
| *H02P 23/14* | (2006.01) |
| *B23Q 5/10* | (2006.01) |

(52) U.S. Cl.
CPC ............... *H02P 23/08* (2013.01); *B23Q 5/10* (2013.01); *H02P 23/14* (2013.01); *B23Q 2220/006* (2013.01); *B23Q 2705/02* (2013.01)

(58) Field of Classification Search
CPC ......... H02P 21/09; H02P 23/08; H02P 27/047
See application file for complete search history.

(56) References Cited

U.S. PATENT DOCUMENTS 5,471,126 A * 11/1995 Kono ...................... H02P 21/09
                                                                    318/799
2016/0218657 A1    7/2016 Nondahl et al.

FOREIGN PATENT DOCUMENTS

| CN | 1974181 | 6/2007 |
|---|---|---|
| JP | 02-278174 | 11/1990 |
| JP | 05-068391 | 3/1993 |

(Continued)

OTHER PUBLICATIONS

Notification of Reasons for Refusal dated May 7, 2019 in Japanese Patent Application No. 2017-146987.

(Continued)

*Primary Examiner* — Karen Masih
(74) *Attorney, Agent, or Firm* — Wenderoth, Lind & Ponack, L.L.P.

(57) ABSTRACT

A motor controller includes: a primary frequency control unit that generates a primary frequency command value based on current information of an induction motor and limits the primary frequency command value based on a maximum primary frequency; a rotation speed estimating unit that estimates a slip frequency based on the current information of the induction motor and estimates a rotation speed based on the estimated slip frequency estimation value and the primary frequency command value; a proximity switch that outputs an ON signal or OFF signal when a portion of a rotating body of the induction motor is in proximity or not in proximity; a rotation speed computing unit that computes a rotation speed based on the ON signal and the OFF signal; and a maximum primary frequency computing unit that computes the maximum primary frequency based on the rotation speed computation value.

6 Claims, 5 Drawing Sheets

(56) References Cited

FOREIGN PATENT DOCUMENTS

| JP | 2011-211768 | 10/2011 |
| JP | 2013-240194 | 11/2013 |
| JP | 5435252 | 12/2013 |

OTHER PUBLICATIONS

Office Action dated Oct. 9, 2019 in Chinese Patent Application No. 2018108379.5.

* cited by examiner

MOTOR CONTROLLER

This application is based on and claims the benefit of priority from Japanese Patent Application No. 2017-146987, filed on 28 Jul., 2017, the content of which is incorporated herein by reference.

BACKGROUND OF THE INVENTION

Field of the Invention

The present invention relates to a motor controller that performs speed sensorless control for an induction motor.

Related Art

A motor controller that drives and controls an induction motor is classified into a motor controller that uses a speed sensor such as a rotary encoder and a motor controller that performs so-called speed sensorless control and does not use such a speed sensor. Patent Documents 1 and 2 disclose a motor controller that performs speed sensorless control for an induction motor.

For example, a motor controller disclosed in Patent Document 2 estimates a primary frequency and a slip frequency of an induction motor from an actual current value (a current FB value) of the induction motor, estimates a rotation speed of the induction motor by subtracting a slip frequency estimation value from a primary frequency estimation value, and drives and controls the induction motor on the basis of this rotation speed estimation value.

Such a motor controller has advantages in a low cost and a small size since the motor controller does not have a speed sensor. Moreover, since wiring for the speed sensor is not necessary, it is possible to enhance water-repellent performance of the induction motor.

Patent Document 1: Japanese Patent No. 5435252

Patent Document 2: Japanese Unexamined Patent Application, Publication No. 2013-240194

SUMMARY OF THE INVENTION

Generally, in speed sensorless control, a present slip frequency estimation value is obtained on the basis of an optimum slip frequency of slip-frequency-control-type vector control.

Here, the actual slip frequency may deviate greatly from a slip frequency estimation value (an optimum slip frequency), that is, an ideal value. Due to this, the actual speed may deviate greatly from the rotation speed estimation value.

This is particularly likely to occur in a heavy load state or during acceleration and deceleration. For example, in a heavy load state, although both the actual speed and the rotation speed estimation value decrease in relation to the speed command value, a decrease in the actual speed tends to be larger than a decrease in the rotation speed estimation value, and a deviation occurs between the actual speed and the rotation speed estimation value. In such a case, since the actual speed becomes smaller than the rotation speed estimation value, the actual slip frequency becomes larger than the slip frequency estimation value according to the following formula.

(Slip frequency)=(Primary frequency)−(Motor speed)

Figure 6:
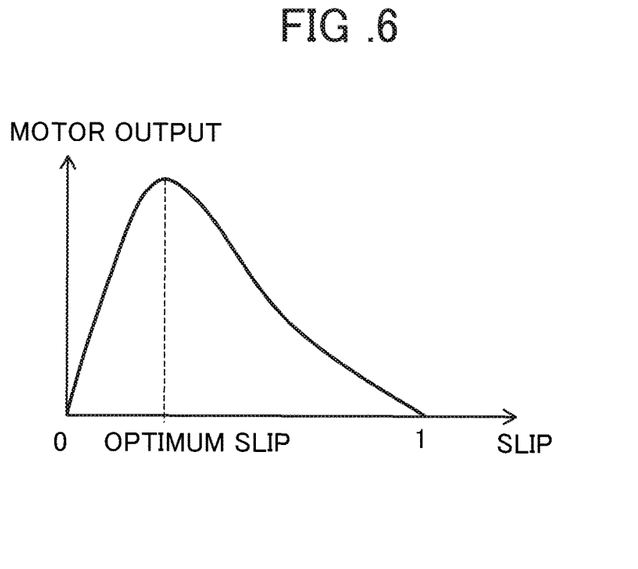
FIG. 6 is a diagram illustrating an example of a relationship between an output of an induction motor and a slip.

FIG. 6 is a diagram illustrating an example of a relationship between the output of the induction motor and a slip. In FIG. 6, a slip is expressed by the following formula.

(Slip)=((Primary frequency)−(Motor speed))/(Primary frequency)=(Slip frequency)/(Primary frequency)

As illustrated in FIG. 6, when an actual slip becomes larger than an optimal slip (that is, when an actual slip frequency becomes larger than an optimum slip frequency), an actual torque decreases and the motor output decreases.

An object of the present invention is to provide a motor controller which performs speed sensorless control for an induction motor and suppresses a decrease in a motor output resulting from a deviation between an actual slip frequency and a slip frequency estimation value (an optimum slip frequency) (a deviation between an actual speed and a rotation speed estimation value).

(1) A motor controller (for example, a motor controller 1 to be described later) according to the present invention is a motor controller that performs speed sensorless control for an induction motor (for example, an induction motor 3 to be described later), including: a primary frequency control unit (for example, a primary frequency control unit 16 to be described later) that generates a primary frequency command value of the induction motor on the basis of current information of the induction motor and limits the primary frequency command value on the basis of a maximum primary frequency; a rotation speed estimating unit (for example, a rotation speed estimating unit 30 to be described later) that estimates a slip frequency of the induction motor on the basis of the current information of the induction motor and estimates a rotation speed of the induction motor on the basis of the estimated slip frequency estimation value and the primary frequency command value from the primary frequency control unit; a speed control system (for example, a speed control system 10 to be described later) that performs speed control of the induction motor on the basis of a speed command value and the rotation speed estimation value estimated by the rotation speed estimating unit; a proximity switch (for example, a proximity switch 31 to be described later) that outputs an ON signal when a portion of a rotating body of the induction motor is in proximity and outputs an OFF signal when a portion of the rotating body of the induction motor is not in proximity; a rotation speed computing unit (for example, a rotation speed computing unit 32 to be described later) that computes a rotation speed of the induction motor on the basis of the ON signal and the OFF signal output from the proximity switch; and a maximum primary frequency computing unit (for example, a maximum primary frequency computing unit 36 to be described later) that computes the maximum primary frequency on the basis of the rotation speed computation value computed by the rotation speed computing unit.

(2) In the motor controller according to (1), the maximum primary frequency computing unit may compute the maximum primary frequency on the basis of the rotation speed computation value and the maximum slip frequency at maximum output of the induction motor.

(3) In the motor controller according to (2), the maximum primary frequency computing unit may compute the maximum slip frequency on the basis of a maximum current value at maximum output of the induction motor.

(4) In the motor controller according to any one of (1) to (3), the primary frequency control unit may limit the primary frequency command value to the maximum primary frequency when the generated primary frequency command value is larger than the maximum primary frequency.

(5) The motor controller according to any one of (1) to (4) may further include: a delay compensating unit (for example, a delay compensating unit 34 to be described later)

that corrects a delay of the rotation speed computation value computed by the rotation speed computing unit with respect to an actual speed, and the maximum primary frequency computing unit may compute the maximum primary frequency on the basis of the rotation speed computation value corrected by the delay compensating unit.

(6) In the motor controller according to (5), the rotation speed computing unit may count the number of pulses of the ON signal output from the proximity switch at a predetermined sampling period, convert the counted number of pulses to a speed, and average the converted speed using a filter to obtain the rotation speed computation value, and the delay compensating unit may have an inverse function of a transfer function of the filter of the rotation speed computing unit.

According to the present invention, it is possible to provide a motor controller which performs speed sensorless control for an induction motor and suppresses a decrease in a motor output resulting from a deviation between an actual slip frequency and a slip frequency estimation value (an optimum slip frequency) (a deviation between an actual speed and a rotation speed estimation value).

DETAILED DESCRIPTION OF THE INVENTION

Hereinafter, an example of an embodiment of the present invention will be described with reference to the accompanying drawings. In the respective drawings, the same or corresponding portions will be denoted by the same reference numerals.

Figure 1:
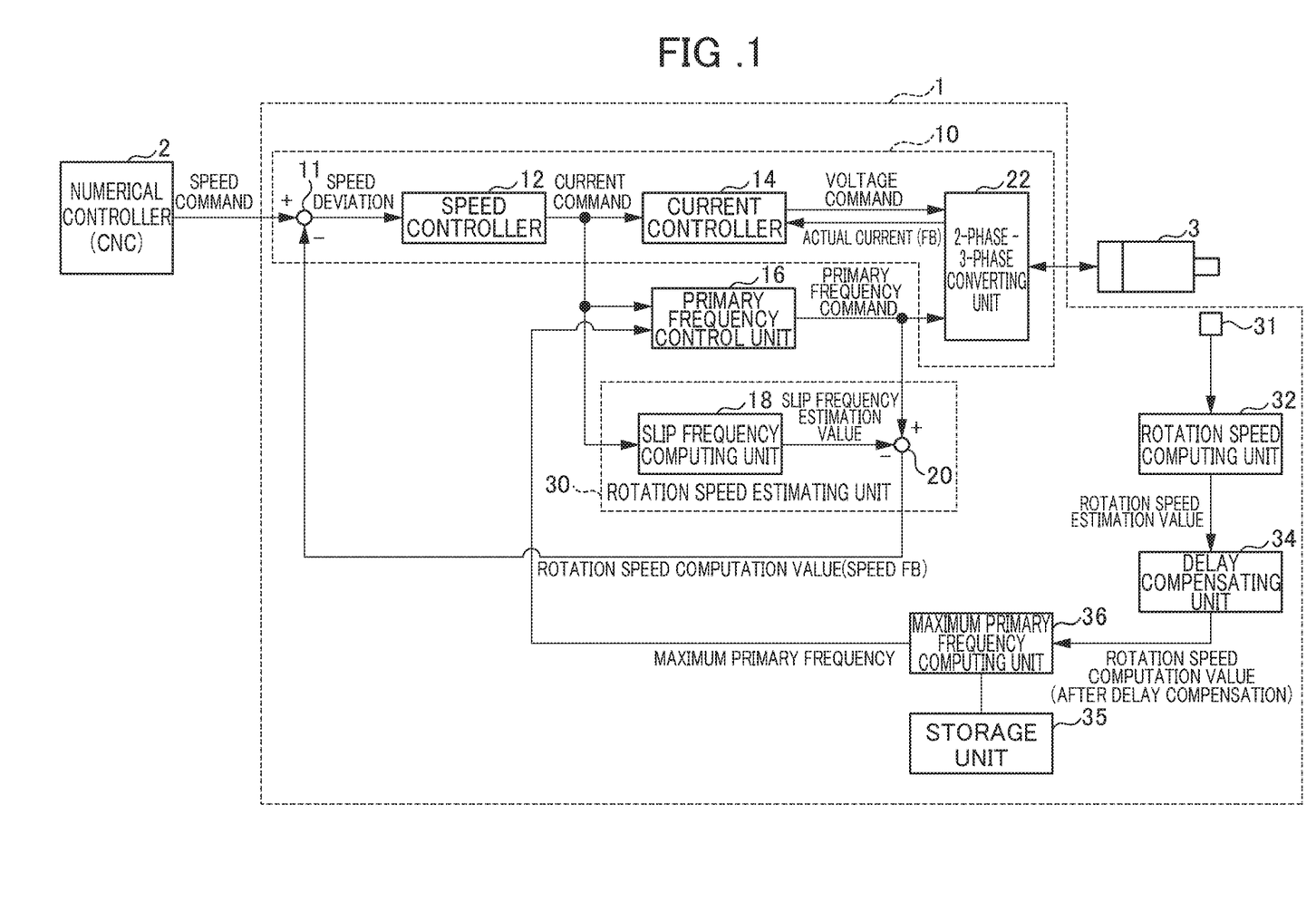
FIG. 1 is a diagram illustrating a configuration of a motor controller according to the present embodiment.

FIG. 1 is a diagram illustrating a configuration of a motor controller according to the present embodiment. A motor controller 1 illustrated in FIG. 1 drives and controls an induction motor 3 according to a speed command which is supplied from a numerical controller (CNC) 2 and is based on a machining program.

The induction motor 3 drives a spindle (a rotating shaft) of a machine tool that performs cutting, for example. The induction motor 3 is so-called a speed sensorless motor that does not have a speed sensor such as a rotary encoder.

The motor controller 1 is a motor controller which performs so-called speed sensorless control which does not use a speed sensor such as a rotary encoder. The motor controller 1 performs vector control of the induction motor 3.

The motor controller 1 includes a subtractor 11, a speed controller 12, a current controller 14, a primary frequency control unit 16, a slip frequency computing unit 18, a subtractor 20, and a 2-phase-3-phase converting unit 22. The subtractor 11, the speed controller 12, the current controller 14, and the 2-phase-3-phase converting unit 22 form a speed control system 10. Moreover, the slip frequency computing unit 18 and the subtractor 20 form a rotation speed estimating unit 30.

The motor controller 1 further includes a proximity switch 31, a rotation speed computing unit 32, a delay compensating unit 34, a storage unit 35, and a maximum primary frequency computing unit 36.

The subtractor 11 obtains a speed deviation between a speed command value supplied from the numerical controller 2 and a rotation speed estimation value (a speed FB) estimated by the rotation speed estimating unit 30 to be described later.

The speed controller 12 performs PI (proportional integral) control, for example, on the speed deviation obtained by the subtractor 11 to generate a current command value (a torque command value).

The current controller 14 generates a voltage command value on the basis of the current command value (a torque command value) generated by the speed controller 12 and an actual current value (a driving current value, a current FB value) of the induction motor 3 detected by a current detector (not illustrated). The current controller 14 performs vector control, for example. Specifically, the current controller 14 generates a d-phase current command value (an excitation current command value) and a q-phase current command value (a torque current command value) from the current command value (the torque command value). The current controller 14 generates a d-phase voltage command value on the basis of a difference between the d-phase current command value and a d-phase actual current value obtained by the 2-phase-3-phase converting unit 22 converting an actual current value of the three UVW phases. Moreover, the current controller 14 generates a q-phase voltage command value on the basis of a difference between the q-phase current command value and a q-phase actual current value obtained by the 2-phase-3-phase converting unit 22 converting an actual current value of the three UVW phases.

The primary frequency control unit 16 generates a primary frequency command value on the basis of the current command value (the torque command value) generated by the speed controller 12.

Various methods are known as a method for calculating the primary frequency command value. For example, an actual current value (for example, a q-phase actual current value) may be used instead of the current command value, and a current deviation between the current command value (for example, a q-phase current command value) and an actual current value (for example, a q-phase actual current value) may be used instead of the current command value.

Moreover, the primary frequency control unit 16 limits the generated primary frequency command value to the maximum primary frequency computed by the maximum primary frequency computing unit 36 to be described later.

The slip frequency computing unit 18 computes a slip frequency estimation value on the basis of the current command value (the torque command value) generated by the speed controller 12. Specifically, the slip frequency computing unit 18 computes an optimum slip frequency of slip-frequency-control-type vector control on the basis of the d-phase current command value and the q-phase current command value to obtain a present slip frequency estimation value. For example, a slip frequency estimation value $\omega_s$ [rad/s] is obtained by the following formula based on a mutual inductance M, a secondary inductance $L_2$, a secondary resistance $R_2$, a secondary d-phase magnetic flux value $\phi_{2d}$, and a primary q-phase current value $i_{1q}$ of the induction motor 3.

$$\omega_s = \frac{MR_2}{L_2} \frac{i_{1q}}{\phi_{2d}}$$

Here, in a normal state, the secondary d-phase magnetic flux value $\phi_{2d}$ is obtained by the following formula based on the mutual inductance M and a primary d-phase current value $i_{1d}$.

$$\phi_{2d} = Mi_{1d}$$

From this, the slip frequency estimation value $\omega_s$ in a normal state is obtained by the following formula (1).

$$\omega_s = \frac{R_2}{L_2} \frac{i_{1q}}{i_{1d}} = K \frac{i_{1q}}{i_{1d}} \qquad (1)$$

In general, K is called a slip constant.

Various methods are known as a method for calculating the frequency estimation value. For example, an actual current value (for example a q-phase actual current value (FB) and a d-phase actual current value (FB)) may be used instead of the current command value.

The subtractor 20 obtains a rotation speed estimation value of the induction motor 3 the following formula (2) based on the primary frequency command value obtained by the primary frequency control unit 16 and the slip frequency estimation value obtained by the slip frequency computing unit 18.

(Rotation speed estimation value)=(Primary frequency command value)−(Slip frequency estimation value) (2)

In the present embodiment, the slip frequency computing unit 18 and the subtractor 20 function as the rotation speed estimating unit 30. That is, the rotation speed estimating unit 30 estimates a slip frequency on the basis of the current command value (current information) generated by the speed controller 12 and a slip constant (that is, a motor constant) and estimates the rotation speed of the induction motor 3 on the basis of the slip frequency estimation value and the primary frequency command value generated by the primary frequency control unit 16.

As described above, the rotation speed estimating unit 30 may use an actual current value (current information) instead of the current command value.

The 2-phase-3-phase converting unit 22 converts the d-phase voltage command value and the q-phase voltage command value generated by the current controller 14 to a voltage command value of the respective UVW phases on the basis of the primary frequency command value generated by the primary frequency control unit 16 to thereby generate a voltage command value for driving the induction motor 3.

The proximity switch 31 is provided in the induction motor 3. The proximity switch 31 may be included in the induction motor 3 and may be provided outside the induction motor 3.

The proximity switch 31 is a proximity switch defined by JIS C 8201-5-2 or IEC60947-5-2, for example, and is an inductive proximity switch, a capacitive proximity switch or the like that detects proximity of a metallic and/or nonmetallic object.

The proximity switch 31 outputs an ON signal when a portion of a shaft (a rotating body) of the induction motor 3 is in proximity and outputs an OFF signal when a portion of the shaft of the induction motor 3 is not in proximity.

Figure 2:
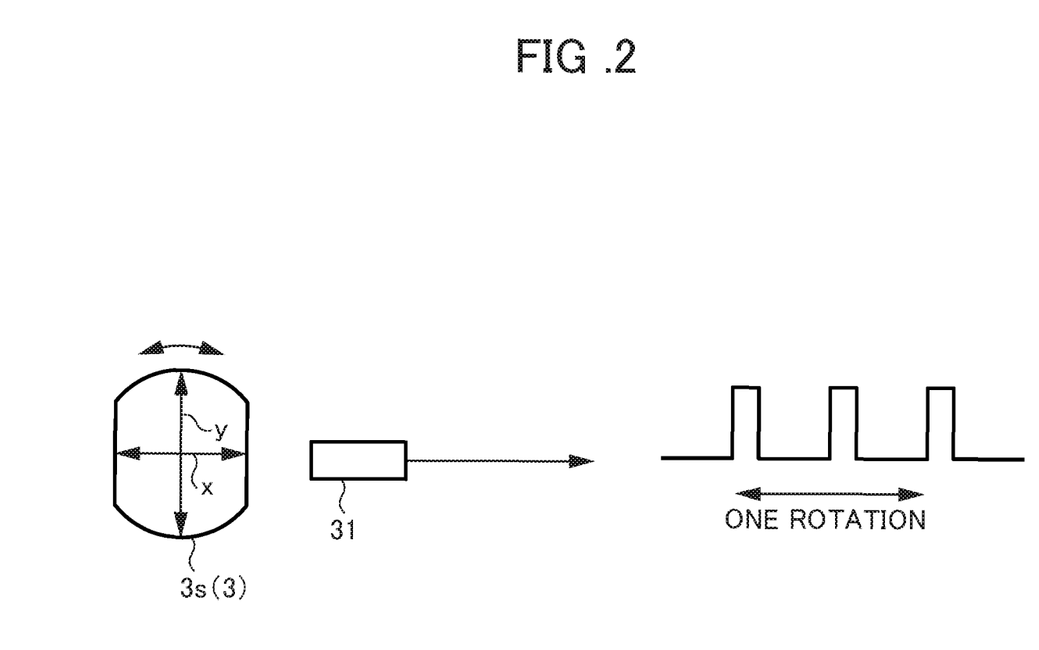
FIG. 2 is a diagram for describing an example of a proximity switch.

For example, as illustrated in FIG. 2, when two orthogonal diameters x and y of a shaft 3s of the induction motor 3 are different, the proximity switch 31 outputs an ON signal (a pulse signal of the HIGH level) when the longer diameter y portion is in proximity and outputs an OFF signal (a signal of the LOW level) when the longer diameter y portion is not in proximity. In the example of FIG. 2, since the longer diameter y portion is in proximity two times when the shaft 3s of the induction motor 3 rotates once, the proximity switch 31 outputs two pulse signals.

The shape of the shaft (rotating body) of the induction motor 3 is not limited to this. A sawtooth shape may be used as the shape of the shaft (rotating body) of the induction motor 3.

The proximity switch 31 is different from a speed sensor such as a rotary encoder used in a speed control system of an induction motor. A difference between a proximity switch and a rotary encoder will be described following.

A rotary encoder outputs A-phase signals and B-phase signals. Due to this, by using the rotary encoder, it is possible to detect a rotating position and a rotating direction in addition to a rotation speed. Moreover, the rotation speed and the rotating position can be detected with high accuracy and at a high speed.

On the other hand, the proximity switch outputs pulses of one phase very smaller than the number of phases of the output pulses of the rotary encoder (typically, pulses of one phase are output once or twice per rotation of the motor). Due to this, by using a proximity switch, it is possible to detect a rotation speed but not possible to detect a rotating position and a rotating direction.

Moreover, when a rotation speed is computed from the pulse output of the proximity switch, since the number of pulses is counted at a predetermined sampling period, the counted number is converted to a speed, and the speed is averaged (smoothed), detection of the rotation speed takes a considerable amount of time. Furthermore, the detection resolution of the rotation speed determined by the sampling period and the averaging time is low. Since the rotation speed computed from the output pulses of the proximity switch has low responsiveness and resolution, it is not possible to use the proximity switch in a speed control system unlike a rotary encoder.

In the present embodiment, the rotation speed of the induction motor is detected in the following manner using a proximity switch rather than a speed sensor such as a rotary encoder.

The rotation speed computing unit 32 computes the rotation speed of the induction motor 3 on the basis of the ON signal and the OFF signal output from the proximity switch 31.

For example, the rotation speed computing unit 32 counts the number of pulses of the ON signal output from the proximity switch 31 at a predetermined sampling period, converts the counted number to a speed, and averages (smoothes) the converted speed using a filter to thereby obtain the rotation speed of the induction motor 3.

When the proximity switch 31 outputs n pulse signals when the shaft 3s of the induction motor 3 rotates once, the number of pulses generated in a sampling period Fs is converted to a speed by the following formula.

Speed (min$^{-1}$)=1/Fs×60/n

The speed computed by this formula is averaged by a filter. Due to this as described above, the computed speed has a detection delay corresponding to a time constant of the filter.

The delay compensating unit 34 corrects a delay of the rotation speed computation value computed by the rotation speed computing unit 32 with respect to an actual speed. Specifically, the delay compensating unit 34 has an inverse function of a transfer function of the filter of the rotation speed computing unit 32. For example, when a transfer function (first-order) of the filter is 1/(τs+1), the transfer function of the delay compensating unit 34 may be τs+1 (τ is a time constant).

The maximum primary frequency computing unit 36 computes a maximum primary frequency by the following formula (3) based on the rotation speed computation value (after delay compensation) corrected by the delay compensating unit 34 and the maximum slip frequency during the maximum output at the rotation speed computation value (after delay compensation) of the induction motor 3.

(Maximum primary frequency)=(Rotation speed computation value (after delay compensation))+ (Maximum slip frequency (after delay compensation)) (3)

The maximum slip frequency is obtained on the basis of the maximum current value during the maximum output of the induction motor 3. For example, the maximum slip frequency $\omega_{smax}$ [rad/s] is obtained by the following formula based on a maximum secondary d-phase magnetic flux value $\phi_{2dmax}$, a maximum primary q-phase current value $i_{1qmax}$, and a maximum primary d-phase current value $i_{1dmax}$.

$$\omega_{smax} = \frac{MR_2}{L_2} \frac{i_{1qmax}}{\phi_{2dmax}} = \frac{R_2}{L_2} \frac{i_{1qmax}}{i_{1dmax}} = K \frac{i_{1qmax}}{i_{1dmax}}$$

Figure 3:
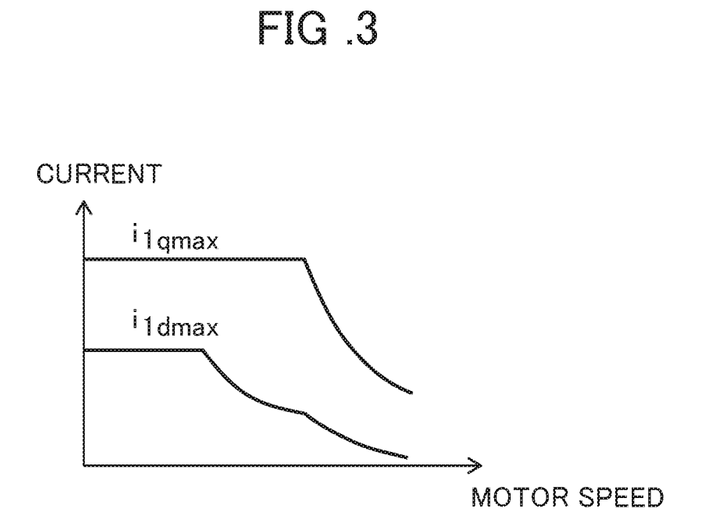
FIG. 3 is a diagram illustrating an example of a relationship between a maximum primary q-phase current and a maximum primary d-phase current and motor speed characteristics during the maximum output of an induction motor.
Figure 4:
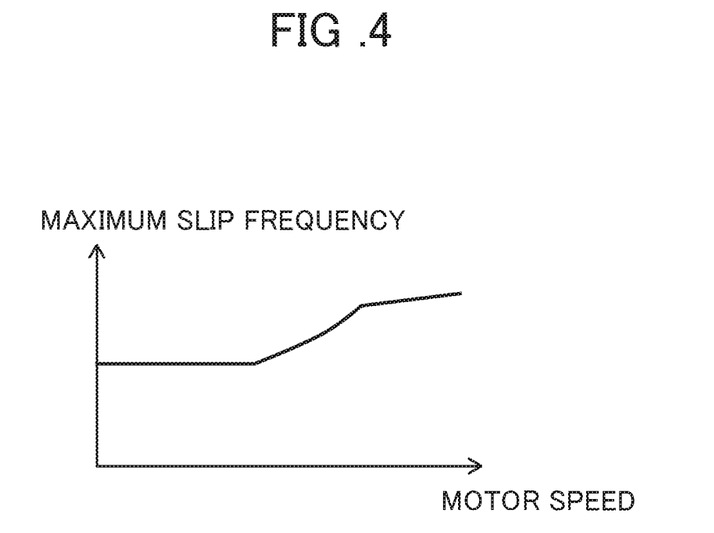
FIG. 4 is a diagram illustrating an example of a relationship between a maximum slip frequency and motor speed characteristics during the maximum output of an induction motor.

For example, as illustrated in FIG. 3, the maximum primary q-phase current value $i_{1qmax}$ and the maximum primary d-phase current value $i_{1dmax}$ have current-motor speed characteristics for each motor. From this, the maximum slip frequency and the motor speed have such a relationship as illustrated in FIG. 4, for example.

The storage unit 35 stores various parameters used for computation in the maximum primary frequency computing unit 36 and computation in the slip frequency computing unit 18 (examples of the parameters include the mutual inductance M, the secondary inductance $L_2$, the secondary resistance $R_2$, the secondary d-phase magnetic flux value $\phi_{2d}$, the primary q-phase current value $i_{1q}$, the primary d-phase current value $i_{1d}$, the maximum secondary d-phase magnetic flux value $\phi_{2dmax}$, the maximum primary q-phase current value $i_{1qmax}$, and the maximum primary d-phase current value $i_{1dmax}$ of the induction motor 3). The storage unit 35 is a rewritable memory such as an EEPROM, for example.

The subtractor 11, the speed controller 12, the current controller 14, the primary frequency control unit 16, the slip frequency computing unit 18, the subtractor 20, the 2-phase-3-phase converting unit 22, the rotation speed estimating unit 30, the rotation speed computing unit 32, the delay compensating unit 34, and the maximum primary frequency computing unit 36 of the motor controller 1 are configured as an arithmetic processor such as a digital signal processor (DSP) or a field-programmable gate array (FPGA), for example. The respective functions of the motor controller 1 are realized by executing predetermined software (a program, an application) stored in a storage unit, for example. The respective functions of the motor controller 1 may be realized by cooperation of hardware and software and may be realized by hardware (electronic circuits) only.

Figure 5:
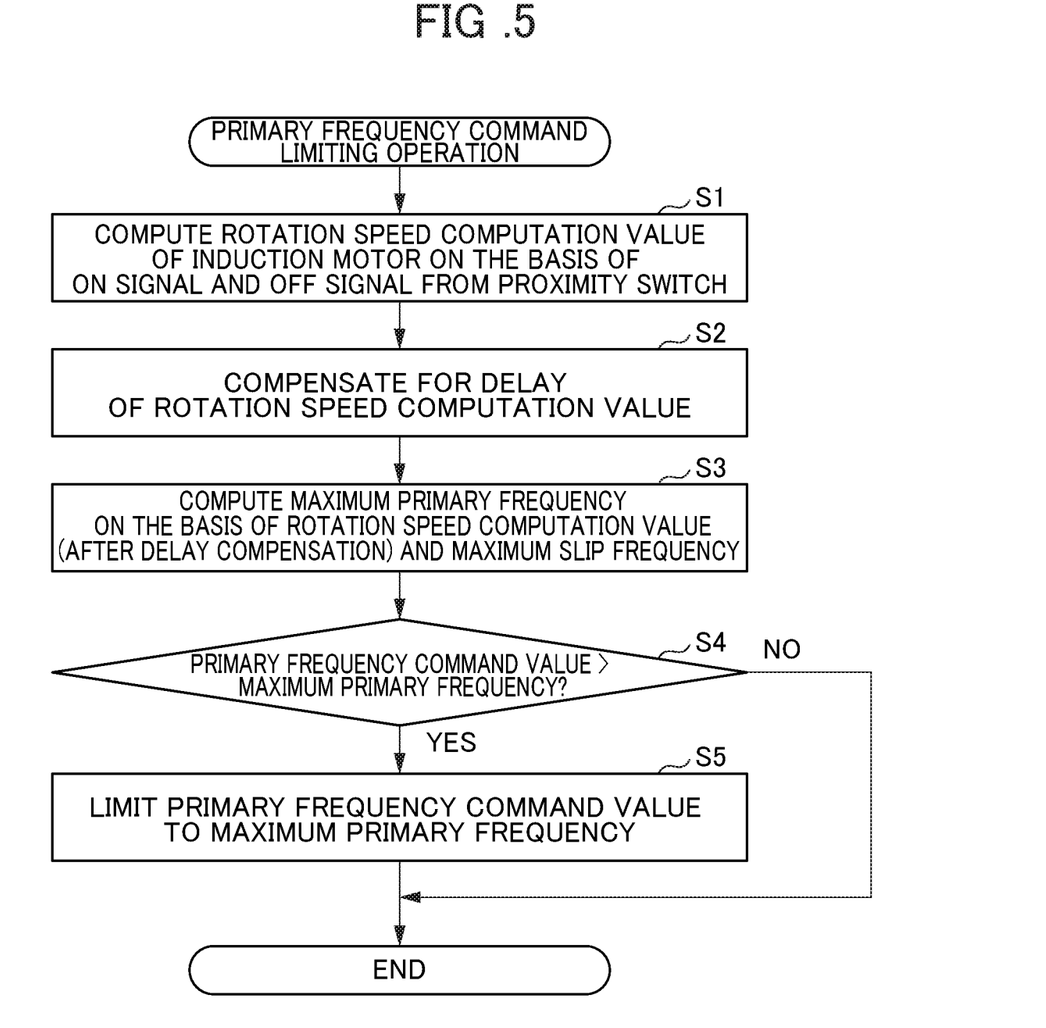
FIG. 5 is a flowchart illustrating a primary frequency command limiting operation of a motor controller according to the present embodiment.

Next, a primary frequency command limiting operation of the motor controller 1 of the present embodiment will be described with reference to FIGS. 1 and 5. FIG. 5 is a flowchart illustrating the primary frequency command limiting operation of the motor controller 1 of the present embodiment.

First, referring to FIG. 1, when a speed command value is supplied from the numerical controller 2, the subtractor 11 obtains a speed deviation between the speed command value and the rotation speed estimation value estimated by the rotation speed estimating unit 30, and the speed controller 12 generates a current command value (a torque command value) on the basis of the speed deviation. The current controller 14 generates a d-phase voltage command value and a q-phase voltage command value on the basis of the current command value and the actual current value (a current FB value) of the induction motor 3 detected by a current detector (not illustrated). In this case, the primary frequency control unit 16 generates a primary frequency command value on the basis of the current command value. The 2-phase-3-phase converting unit 22 converts the d-phase voltage command value and the q-phase voltage command value generated by the current controller 14 to a voltage command value of the respective UVW phases on the basis of the primary frequency command value generated by the primary frequency control unit 16 and supplies the voltage command value to the induction motor 3.

In this case, the slip frequency computing unit 18 of the rotation speed estimating unit 30 computes an optimum slip frequency of slip-frequency-control-type vector control on the basis of the d-phase current command value and the q-phase current command value to obtain a present slip frequency estimation value. For example, the slip frequency estimation value $\omega_s$ is obtained by the formula (1). The subtractor 20 obtains a rotation speed estimation value by the formula (2) based on the primary frequency command value and the slip frequency estimation value.

Here, the actual slip frequency may deviate greatly from a slip frequency estimation value (an optimum slip frequency) $\omega_s$ (that is, an ideal value). Due to this, the actual speed may deviate greatly from the rotation speed estimation value.

This is particularly likely to occur in a heavy load state or during acceleration and deceleration. For example, when the actual speed is small, from the relation of the following formula (4), the actual slip frequency is large. In such a case, the actual speed becomes smaller than the rotation speed estimation value, and the actual slip frequency becomes larger than the slip frequency estimation value.

(Slip frequency)=(Primary frequency)−(Motor speed) (4)

FIG. 6 is a diagram illustrating an example of a relationship between the output of the induction motor and a slip. In FIG. 6, a slip is expressed by the following formula.

(Slip)=((Primary frequency)−(Motor speed))/(Primary frequency)=(Slip frequency)/(Primary frequency)

As illustrated in FIG. 6, when an actual slip becomes larger than an optimal slip (that is, when an actual slip frequency becomes larger than an optimum slip frequency), an actual torque decreases and the motor output decreases.

Therefore, in the present embodiment, when the actual speed decreases (the actual speed deviates from the rotation speed estimation value), the primary frequency command value is limited so that the actual slip frequency does not increase too much. More specifically, as the actual speed decreases (the actual speed deviates from the rotation speed estimation value) (that is, the actual slip frequency increases), the primary frequency command value is limited so as to decrease further.

Specifically, as illustrated in FIG. 5, the rotation speed computing unit 32 computes and detects rotation speed of the induction motor 3 on the basis of the ON signal and the OFF signal from the proximity switch 31 (S1).

Subsequently, the delay compensating unit 34 corrects a delay of the rotation speed computation value computed by the rotation speed computing unit 32 with respect to an actual speed value (S2).

Subsequently, the maximum primary frequency computing unit 36 computes a maximum primary frequency by the formula (3) based on the rotation speed computation value (after delay compensation) corrected by the delay compensating unit 34 and the maximum slip frequency during the maximum output of the induction motor 3 (S3).

Subsequently, the primary frequency control unit 16 determines whether the primary frequency command value generated on the basis of the current command value is larger than the maximum primary frequency computed by the maximum primary frequency computing unit 36 (S4). When the generated primary frequency command value is larger than the maximum primary frequency, the primary frequency control unit 16 limits the generated primary frequency command value to the maximum primary frequency (S5).

On the other hand, when the generated primary frequency command value is equal to or smaller than the maximum primary frequency, the primary frequency control unit 16 does not limit the primary frequency command value but outputs the same as it is.

As described above, according to the motor controller 1 of the present embodiment, the proximity switch 31 and the rotation speed computing unit 32 detect the actual speed (the rotation speed computation value) of the induction motor 3, and the maximum primary frequency computing unit 36 computes the maximum primary frequency on the basis of the detected actual speed (the rotation speed computation value) of the induction motor 3. In this way, the maximum primary frequency computing unit 36 sets the maximum primary frequency so that the smaller the actual speed (the more the actual speed deviates from the rotation speed estimation value) (that is, the larger the actual frequency), the smaller the maximum primary frequency (see formula (3) above).

The primary frequency control unit 16 limits the primary frequency command value generated nn the basis of the current command value to the maximum primary frequency. In this way, when the actual speed becomes smaller (that is, when the actual speed deviates from the rotation speed estimation value), the primary frequency command value is limited so that the actual slip frequency does not increase too much (see formula (4) above). More specifically, the primary frequency command value is limited so that the smaller the actual speed (the more the actual speed deviates from the rotation speed estimation value), the smaller the primary frequency command value to thereby suppress an increase in the slip frequency further.

In this way, it is possible suppress a decrease in the motor output resulting from a deviation between the actual slip frequency and the slip frequency estimation value (an optimal slip frequency) (a deviation between the actual speed and the rotation speed estimation value).

Figure 7:
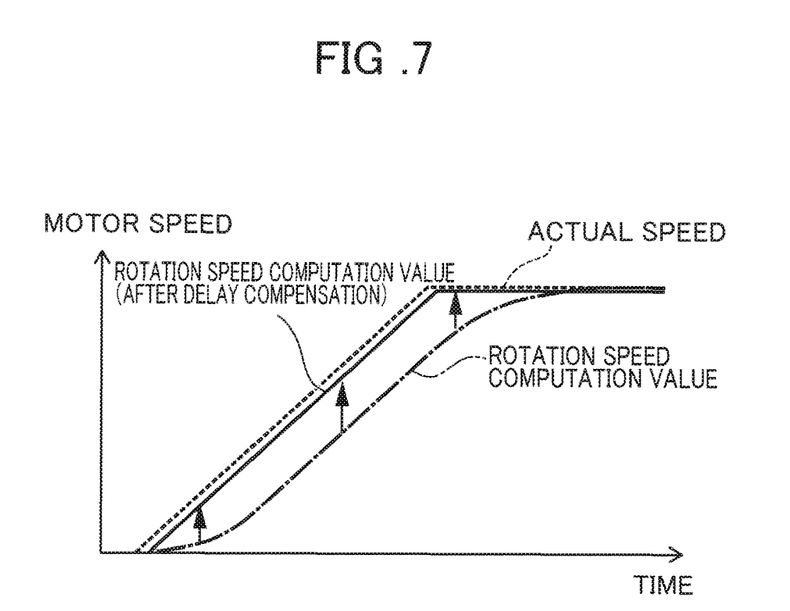
FIG. 7 is a diagram for describing an example of a delay compensating unit.

However, as illustrated in FIG. 7, the rotation speed computation value computed by the rotation speed computing unit 32 has a delay corresponding to the time constant of the filter or the rotation speed computing unit 32 in relation to the actual speed.

In this regard, according to the motor controller 1 of the present embodiment, the delay compensating unit 34 generates a rotation speed computation value (after delay compensation) obtained by correcting a delay of the rotation speed computation value in relation to the actual speed. In this way, the maximum primary frequency computing unit 36 can compute the maximum primary frequency on the basis of the rotation speed computation value (after delay compensation) closer to the actual speed, and the primary frequency control unit 16 can limit the primary frequency command value generated on the basis of the current command value more appropriately to this maximum primary frequency.

As a result, it is possible to further suppress a decrease in the motor output resulting from a deviation between the actual slip frequency and the slip frequency estimation value (a deviation between the actual speed and the rotation speed estimation value).

While an embodiment of the present invention has been described, the present invention is not limited to the above-described embodiment. The advantages described in the present embodiment are examples of the most preferable advantages obtained from the present invention, and the advantages of the present invention are not limited to those described in the present embodiment.

For example, in the above-described embodiment, the motor controller 1 may not necessarily include the delay compensating unit 34. When the delay compensating unit 34 is not included, the maximum primary frequency computing unit 36 may compute the maximum primary frequency by the following formula based on the rotation speed computation value itself computed by the rotation speed computing unit 32 and the maximum slip frequency at the maximum output at the rotation speed computation value of the induction motor 3 rather than formula (3) above.

(Maximum primary frequency)=(Rotation speed computation value)+(Maximum slip frequency)

Moreover, in the above-described embodiment, although the rotation speed computing unit 32 obtains the rotation speed computation value by averaging the speed converted from the number of pulses of the ON signal output from the proximity switch 31 using a filter, the present invention is not limited thereto. For example, the rotation speed computing unit 32 may obtain the rotation speed computation value by averaging the speed converted from the number of pulses of the ON signal output from the proximity switch 31 in a predetermined period without using the filter. In this case, the delay compensating unit 34 may correct the rotation speed computation value so as to advance (progress) by a predetermined period for averaging of the rotation speed computing unit 32.

EXPLANATION OF REFERENCE NUMERALS

1: Motor controller
2: Numerical controller (CNC)
3: Induction motor
3s: Shaft (rotating body)
10: Speed control system
11, 20: Subtractor
12: Speed controller
14: Current controller
16: Primary frequency control unit
18: Slip frequency computing unit
22: 2-phase-3-phase converting unit
30: Rotation speed estimating unit
31: Proximity switch
32: Rotation speed computing unit
34: Delay compensating unit
35: Storage unit
36: Maximum primary frequency computing unit

What is claimed is:

1. A motor controller that performs speed control for an induction motor, comprising:
   a primary frequency control unit that generates a primary frequency command value of the induction motor based on current information of the induction motor, and limits the primary frequency command value based on a maximum primary frequency;
   a rotation speed estimating unit that estimates a slip frequency of the induction motor based on the current information of the induction motor and estimates a rotation speed of the induction motor based on the estimated slip frequency and the primary frequency command value from the primary frequency control unit;
   a speed control system that performs speed control of the induction motor based on a speed command value and the rotation speed estimated by the rotation speed estimating unit;
   a proximity switch that outputs an ON signal when a portion of a rotating body of the induction motor is in proximity to the proximity switch, and outputs an OFF signal when a portion of the rotating body of the induction motor is not in proximity to the proximity switch;
   a rotation speed computing unit that computes a rotation speed of the induction motor based on the ON signal and the OFF signal output from the proximity switch; and
   a maximum primary frequency computing unit that computes the maximum primary frequency based on the rotation speed computed by the rotation speed computing unit.

2. The motor controller according to claim 1, wherein the maximum primary frequency computing unit computes the maximum primary frequency based on the rotation speed computed by the rotation speed computing unit and a maximum slip frequency at maximum output of the induction motor.

3. The motor controller according to claim 2, wherein the maximum primary frequency computing unit computes the maximum slip frequency based on a maximum current value at maximum output of the induction motor.

4. The motor controller according to claim 1, wherein the primary frequency control unit limits the primary frequency command value to the maximum primary frequency.

5. The motor controller according to claim 1, further comprising: a delay compensating unit that corrects a delay of the rotation speed computed by the rotation speed computing unit with respect to an actual speed,
   wherein the maximum primary frequency computing unit computes the maximum primary frequency based on the rotation speed corrected by the delay compensating unit.

6. The motor controller according to claim 5, wherein the rotation speed computing unit counts the number of pulses of the ON signal output from the proximity switch in a predetermined sampling period, converts the counted number of pulses to a speed, and averages the converted speed using a filter to obtain the rotation speed computation value, and
   the delay compensating unit has an inverse function of a transfer function of the filter of the rotation speed computing unit.

* * * * *